United States Patent
Strong

(10) Patent No.: US 8,949,885 B2
(45) Date of Patent: Feb. 3, 2015

(54) SYSTEMS, METHODS AND APPARATUS FOR TRANSMITTING WEATHER INFORMATION IN A TELEVISION DISTRIBUTION NETWORK

(75) Inventor: Stephen Strong, Dunwoody, GA (US)

(73) Assignee: EchoStar Technologies L.L.C., Englewood, CO (US)

(*) Notice: Subject to any disclaimer, the term of this patent is extended or adjusted under 35 U.S.C. 154(b) by 983 days.

(21) Appl. No.: 12/847,917

(22) Filed: Jul. 30, 2010

(65) Prior Publication Data

US 2012/0030703 A1 Feb. 2, 2012

(51) Int. Cl.
| | |
|---|---|
| H04N 7/10 | (2006.01) |
| H04N 7/20 | (2006.01) |
| H04N 7/173 | (2011.01) |
| H04N 21/488 | (2011.01) |
| H04H 20/59 | (2008.01) |
| H04H 60/71 | (2008.01) |

(52) U.S. Cl.
CPC .......... *H04N 21/4882* (2013.01); *H04H 20/59* (2013.01); *H04H 60/71* (2013.01); *H04H 21/6543* (2013.01); *H04H 21/814* (2013.01)
USPC ............................... 725/33; 725/68; 725/118

(58) Field of Classification Search
USPC ............................................. 725/33, 68, 118
See application file for complete search history.

(56) References Cited

U.S. PATENT DOCUMENTS

| | | | | |
|---|---|---|---|---|
| 2006/0005219 | A1* | 1/2006 | Owens | 725/33 |
| 2007/0157209 | A1* | 7/2007 | Hashimoto et al. | 718/104 |
| 2008/0243760 | A1* | 10/2008 | Kou | 707/1 |
| 2009/0128359 | A1* | 5/2009 | Whattam | 340/825.49 |
| 2010/0088718 | A1* | 4/2010 | Hasek et al. | 725/33 |

OTHER PUBLICATIONS

"Emergency Alert System", Wikipedia, Jul. 8, 2010.
"Integrated Public Alert and Warning System (IPAWS) Overview", FEMA, Sep. 21, 2006.
Letter from Deirdre Cheek of the Alliance for Telecommunications Industry Solutions to the Federal Communications Commission, regarding Commercial Mobile Alert System, Oct. 23, 2008.

* cited by examiner

*Primary Examiner* — Pankaj Kumar
*Assistant Examiner* — Franklin Andramuno
(74) *Attorney, Agent, or Firm* — Seed IP Law Group PLLC

(57) ABSTRACT

Described herein are techniques for transmitting alert information in association with television programming in a transport stream. The alert information may be transmitted to a plurality of television receivers for which the message may be applicable to at least a portion of the television receivers. Each television receiver receives the alert information and determines whether to output the alert information for presentation to a user.

22 Claims, 4 Drawing Sheets

SYSTEMS, METHODS AND APPARATUS FOR TRANSMITTING WEATHER INFORMATION IN A TELEVISION DISTRIBUTION NETWORK

BACKGROUND

Emergency Alert System (EAS) and National Weather Service (NWS) messages are a common sight in television programming. A content provider, such as a local television station, receives an emergency alert, often associated with adverse weather conditions, from a government agency, such as the NWS. The emergency alert is then presented in the broadcast programming by the local television station. For example, the television programming may be resized such that the weather alert is presented in a bottom portion of the screen in association with the television program, warning the user of an adverse weather condition, such as a tornado, approaching the area. In other embodiments, the emergency alert may be audible only, with the television programming being interrupted by a textual message displayed on screen while the audible information is presented in association therewith.

One problem with the presently implemented EAS system is the targeting of geographically relevant weather alert messages across a wide broadcast area, such as a national broadcast offered by a satellite television provider. Most weather alerts are only relevant to a relatively small geographic area, such as a state, county or city and not the entire broadcast footprint of a satellite television provider. The localized channels broadcast by a provider within a large footprint will most likely already carry an applicable local weather alert based on the inclusion of the EAS message by the local television station.

However, most national channels are broadcast into many different designated market areas (DMAs) of which the weather alert is most likely not applicable to the users in the other DMAs. Thus, it becomes a problem for a satellite provider to provide localized weather alerts for national channels. For example, if each weather alert was inserted into each channel on the service, then users could potentially see a large number of weather alerts applicable only to other regions of the country (e.g., a user in California may be presented with a weather alert for Maine). The presentation of these non-localized weather alerts is generally unhelpful to non-affected areas and detracts from the television programming being broadcast. Furthermore, if users are presented with a large number of generally inapplicable weather alerts, then over time, many users will begin to ignore all weather alerts. As users develop a general indifference to all weather alerts, some users may miss important weather alerts targeted towards their area, defeating the purpose of the EAS messages. Thus, it is desirable for techniques that allow for the broadcast of localized weather alerts and other emergency alert information across disparate geographic areas while presenting such localized information to users in the relevant areas.

BRIEF DESCRIPTION OF THE DRAWINGS

The same number represents the same element or same type of element in all drawings.

DETAILED DESCRIPTION OF THE DRAWINGS

Figure 1:
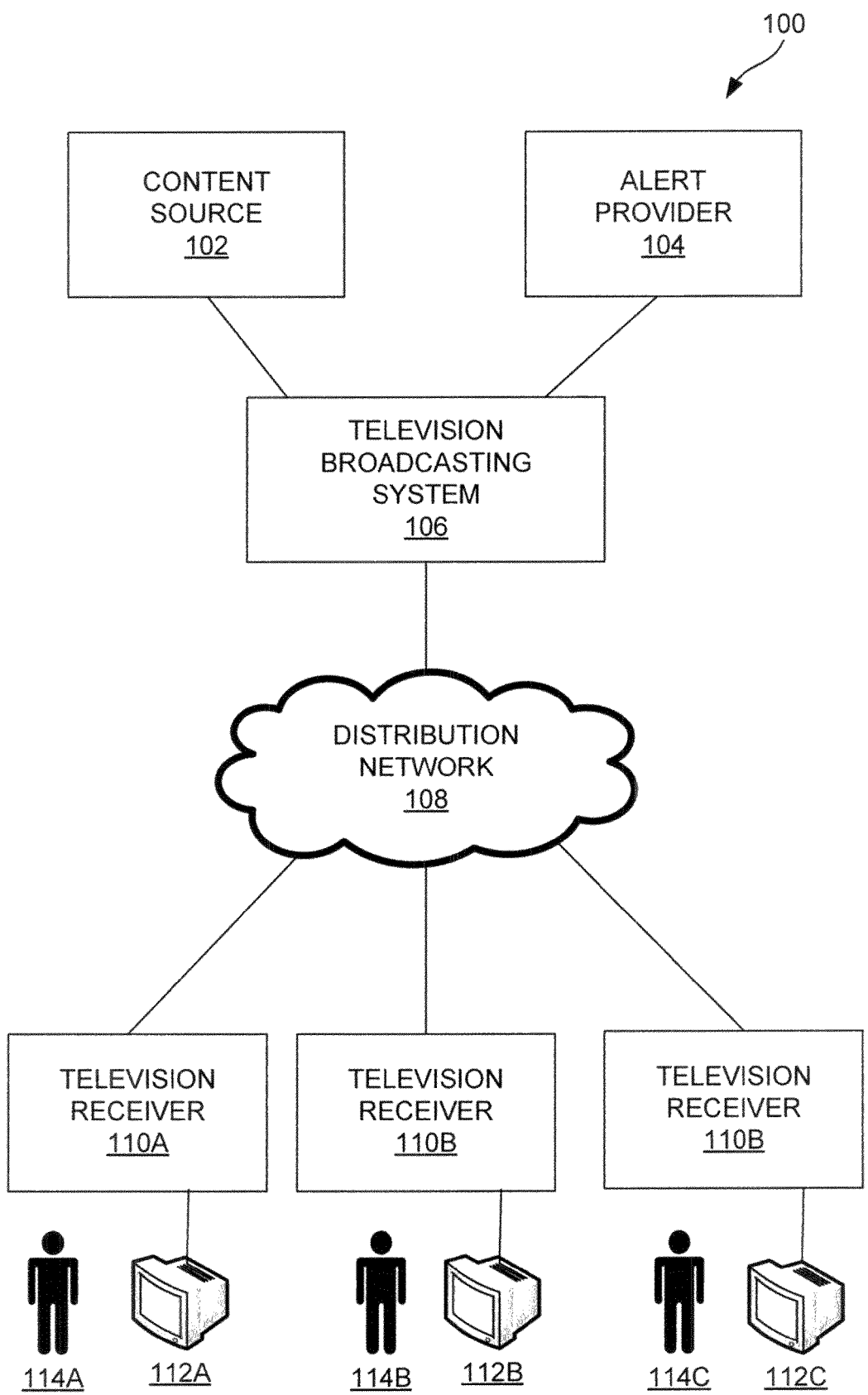
FIG. 1 illustrates an embodiment of a communication system.

The various embodiments described herein generally provide apparatus, systems and methods which facilitate the reception, processing and outputting of content from one or more sources, via one or more communications mediums (or networks), for use by one or more users (or subscribers). More particularly, described herein are techniques for broadcasting weather information and other emergency alert information to multiple television receivers. Such television receivers may be located in disparate geographic areas. Each television receiver processes the received weather information and/or emergency alert information and determines whether to output the associated information for presentation by an associated presentation device.

As used herein, "weather information" refers to any information regarding weather conditions, including weather alerts (e.g., National Weather Service (NWS) alerts), forecast information, radar and satellite weather images and the like. Furthermore, as used herein "emergency alert information" refers to any type of alert information transmitted to users, including civil emergency messages, immediate evacuation messages, emergency action notifications, AMBER alert messages (e.g., missing child alerts), weather alerts and the like. "Weather information" and "emergency alert information" may be described herein as "alert information", which may refer to any type or combination of the "weather information" and "emergency alert information". While the techniques described herein are illustrated in the context of the United States Emergency Alert System (EAS), it is to be appreciated that the techniques may be applied to any type weather or emergency alert system.

At least one embodiment described herein comprises a television receiver operable to receive and output alert information. The television receiver comprises a communication interface operable to receive a transport stream. The transport stream includes a first set of packets associated with a first television program and a second set of packets associated with alert information. The television receiver also includes control logic communicatively coupled to the communication interface operable to process the second set of packets to determine whether to output the alert information. An output interface of the television receiver is operable to output at least one of the first television program and the alert information for presentation by a presentation device.

Another embodiment comprises a method for presenting weather information on a television receiver. The method includes receiving a transport stream at a television receiver, the transport stream including a first set of packets associated with a first television program and a second set of packets associated with emergency alert information. The method further includes outputting the first television program for presentation by a presentation device and processing the second set of packets to determine whether to output the emergency alert information. Responsive to determining that the emergency alert information is to be outputted, the method includes outputting the emergency alert information, in association with the television program, for presentation by the presentation device.

Another embodiment comprises a television broadcasting system operable to aggregate alert information and television programming for transmission to a plurality of television receivers. The television broadcasting system comprises a first communication interface operable to receive at least one television program from at least one content source and a second communication interface operable to receive weather information from a weather service provider. Control logic of the television broadcasting system is operable to multiplex the television program and the weather information into a transport stream. The television broadcasting system also includes a transmitter operable to initiate broadcasting of the transport stream to a plurality of television receivers.

Various embodiments described herein are illustrated in the context of a satellite television distribution network. While the techniques illustrated herein are particularly applicable to a satellite television distribution network that operates over a wide geographic area, it is to be appreciated that these techniques may be applied to any type of distribution network, such as cable television, internet protocol television (IPTV) and terrestrial television distribution networks.

FIG. 1 illustrates an embodiment of a communication system 100. The communication system 100 includes a content source 102, an alert provider 104, a broadcasting system 106, a distribution network 108, a plurality of television receivers 110A-110C and a plurality of presentation devices 112A-112C. Each of these components is discussed in greater detail below. The communication system 100 may include other components, elements or devices not illustrated for the sake of brevity.

The content source 102 provides the television broadcasting system 106 with television programs and/or other audio/visual content that is broadcast to the television receivers 110A-110C for viewing by the users 114A-114C using the presentation devices 112A-112C. The content source 102 may transmit content to the television broadcasting system 106 using any type of appropriate communication medium, including satellite, fiber optic, coaxial cable, microwave, terrestrial television communication links and the like. The communication system 100 may include any number of content sources 102 that provide audio/video content to the television broadcasting system 106 for broadcast to the television receivers 110A-110C. For example, each separate content source 102 may provide one or more different channels distributed by the television broadcasting system 106.

The alert provider 104 is operable to provide alert information to the television broadcasting system 106 for further distribution. As described above, alert information may include emergency alerts, weather alerts and/or weather forecast information and the like. The alert information may be provided by the alert provider 104 in any appropriate format. In at least one embodiment, the alert information is received in an Emergency Managers Weather Information Network (EMWIN) format, which utilizes various sets of predefined codes to specify information for dissemination to the public. For example, weather alerts may be received as ASCII data and parsed by the distribution network 106 for further broadcasting to the television receivers 110A-110C.

In at least one embodiment, the distribution network 106 receives the alert information from the National Oceanic & Atmospheric Administration (NOAA) GOES satellites. The NOAH provides weather and emergency alert information via the GOES 11 and 12 satellites in a geosynchronous orbit. The GOES satellites provide weather data on 1690.725 MHz at a 9600 bps data rate. Alert information is also available over the internet and via various radio repeaters operated by the NWS, citizens and other organizations. Thus, in various embodiments, the distribution network 106 may receive the alert information from the NOAA and NWS via any available distribution mechanism depending on desired design criteria.

In at least one embodiment, the distribution network 106 includes a five foot dish and a Zephyrus WX-13 receiver to receive the weather information from the GOES Satellites. The Zephyrus WX-13 receiver is a satellite receiving system designed to receive 9600 baud EMWIN data from the NOAA GOES satellites. The Zephyrus WX-13 receiver is manufactured by Zephyrus Electronics, Ltd. of Tulsa, Okla. It is to be appreciated that other satellite antenna and satellite receiver equipment may be utilized depending on desired design criteria.

The distribution network 106 is operable to receive the television programming from the content source 102 and the alert information from the alert provider 104, process the received television programming and alert information and initiate broadcast of the television programming and alert information through the television distribution network 108. In at least one embodiment, the distribution network 106 comprises a satellite television uplink center operable to aggregate content for transmission to the television receivers 110A-110C via an orbiting satellite. The distribution network 106 may include various components operable to receive, process and broadcast the television programming and alert information over a satellite communication link to the television receivers 110A-110C.

For example, the distribution network 106 may comprise a satellite reception antenna operable to receive television programming from one or more orbiting geosynchronous satellites. Each orbiting satellite may provide various television programming for redistribution by the television distribution network 108. Various reception, decryption, decoding and encoding equipment may be utilized by the distribution network 106 to process and format the television programming for broadcast. For example, each television program may be converted into an appropriate video format (e.g., Motion Picture Experts Group (MPEG)-2 or MPEG-4)) for transmission and assigned one or more program identifiers (PIDs) for identification within an MPEG transport stream.

The distribution network 106 may include processing components operable to reformat that alert information into a format compatible with the television receivers 110A-110C. In at least one embodiment, header information may be removed from the alert information as received from the alert provider 104. Furthermore, appropriate header information compatible with the television receivers 110A-110C may be associated with the payload data of the weather information for broadcast through the television distribution network 108. For example, geographic identifiers compatible with the television receivers 110A-110C may be associated with the weather information, such that the television receivers 110A-110C can differentiate relevant and non-relevant alert information for output to the users 114A-114C depending on a geographic location of the television receiver 110A-110C or otherwise a geographic area of interest to the users 114A-114C.

In at least one embodiment, the geographic identifiers may comprise emergency alert system (EAS) specific area message encoding (SAME) codes. The SAME location codes are formatted as "PSSCCC" strings. The "P" refers to a county subdivision. Each county is divided into nine portions ("1": Northwest, "2": North Central, "3": Northeast, "4": West Central, "5": Central, "6": East Central, "7": Southwest, "8": South Central, "9": Southeast. A "0" code refers to all nine subdivisions of a county. The "SS" refers to the state number and the "CCC" refers to the county number. For example, the code "008031" refers to all of Denver County in the State of Colorado. A message can specify multiple SAME codes, such as the Northwest Corner of one county and the Southwest corner of a neighboring county.

In another embodiment, the geographic identifiers can be based on zip codes. For example, alert information can specify the relevant zip codes for the message (e.g., the area code 80112). In another embodiment, a partial zip code can be used, e.g., "8011*" would target the message to any zip code from 80110 to 80119. If the alert information as received from the National Weather Service specifies a SAME code, then the television broadcast system 106 may perform a conversion process to translate the SAME codes into the corresponding zip code for processing by the television receiver 110A-110C. Similarly, the television receiver 110A-110C may include logic for translating SAME codes into corresponding zip code information.

The distribution network 106 is operable to multiplex the television programming and the alert information into a transport stream for broadcast via the television distribution network 108. In at least one embodiment, each television program in the transport stream may be associated with one or more PIDs and the alert information may be associated with a different PID. For example, a first television program may have an associated video component (PID #1) and an audio component (PID #2). Another television program may have an associated video component (PID #3) and an audio component (PID #4). The alert information may be assigned to PID #5.

In at least one embodiment, the distribution network 106 may broadcast transport streams on multiple signal communication channels. For example, a satellite television provider may utilize multiple transponder signals on a single satellite or even multiple transponder signals on multiple satellites. Likewise, a cable television provider may utilize multiple quadrature amplitude modulation (QAM) channels to distribute content across the cable network. In at least one embodiment, the weather information may be transmitted within multiple signal communication channels. For example, the weather information may be transmitted in a PID for each of the transponders of the satellite. Thus, a television receiver 110A-110C receiving content on any signal communication channel may be capable of receiving the weather alerts while simultaneously receiving audio/video content. While the distribution network 106 has been illustrated in the context of a satellite uplink center, in other embodiments, the television broadcasting system 106 may be embodied as an over-the-air (OTA) terrestrial transmission facility, a cable television distribution head-end, an internet protocol (IPTV) distribution center and the like. Similar components may be utilized to receive television programming and weather information/emergency alerts and format both into one or more transport streams for distribution.

The television distribution network 106 is operable to transmit content from the television broadcasting system 106 to the television receivers 110A-110C. The television distribution network 106 may comprise any type of wired (e.g., cable and fiber) and/or wireless (e.g., cellular, satellite, microwave, and other types of radio frequency) communication medium and any desired network topology (or topologies when multiple mediums are utilized). Exemplary distribution networks 106 include terrestrial, cable, satellite and internet protocol distribution networks. In at least one embodiment, the television distribution network 106 broadcasts or multicasts content to a plurality of television receivers 110A-110C. The television distribution network 106 may also distribute content to a specific addressable television receiver 110A-110C, such as video-on-demand content and the like. The television distribution network 106 may also distribute non-video content, such as electronic programming guide data and the like which is processed by the television receivers 110A-110C.

The television receivers 110A-110C are operable to receive content from the television distribution network 106 and output the received content for presentation by an associated presentation device 112A-112C. In at least one embodiment, the presentation devices 112A-112C are display devices (e.g., televisions) configured to display content to the users 114A-114C, respectively. A television receiver 110A-110C may receive an audio/video stream in any format (e.g., analog or digital format) and output the audio/video stream for presentation by the associated presentation device 112A-112C. In at least one embodiment, a television receiver 110A-110C may comprise a set-top box (e.g., a satellite television receiver, cable television receiver, terrestrial television receiver, internet protocol television (IPTV) receiver or any other type of receiver/converter box) or other similar device that processes and provides one or more audio and/or video output streams to a presentation device 112A-112C for presentation to the users 114A-114C. A television receiver 110A-110C may be further configured to output menus and other information that allow a user 114A-114C to control the output of audio/video content by the television receiver 110A-110C, view electronic programming guides, set recording timers and the like.

A presentation device 112A-112C may comprise any type of device capable of receiving and outputting a video signal in any format. Exemplary embodiments of the presentation device 112A-112C include a television, a computer monitor, a liquid crystal display (LCD) screen, a touch screen and a projector. The presentation device 112A-112C and the television receiver 110A-110C may be communicatively coupled through any type of wired or wireless interface. For example, the presentation device 112A-112C may be communicatively coupled to the television receiver 110A-110C through a coaxial cable, component or composite video cables, an HDMI cable, a VGA or SVGA cable, a Bluetooth or WiFi wireless connection or the like. In some embodiments, the television receiver 110A-110C and the presentation device 112A-112C may be integrated as a device combining the functionality of a display device and a television receiver, such as a television with integrated CableCard functionality.

Each television receiver 110A-110C is configured to receive audio/video content and other data in a transport stream and select portions of the transport stream for output to the users 114A-114C. For example, a user 114A may select to view a movie channel via the television receiver 110A. The television receiver 110A tunes to the appropriate signal communication channel carrying the corresponding transport stream and extracts the audio/video content associated with the movie channel for output to the presentation device 112A.

The television receiver 110A also receives weather information multiplexed into the transport stream with the audio/video content. For example, the television receiver 110A may receive multiple weather alerts, emergency alerts, forecast information and the like, some of which may be geographically or contextually relevant to the location of the user 114A, and others of which have no relevance to the user 114A. In at least one embodiment, the television receiver 110A parses the weather alerts, emergency alerts and forecast information to identify which are geographically and/or contextually relevant to the user 114A. For example, the television receiver 110A may include one or more geographic identifiers which are compared against corresponding geographic identifiers in the alert information.

The geographic identifiers associated with the television receiver 110A may be preset by the broadcast provider or may be selected by the user 114A, depending on desired design criteria. For example, the broadcast provider may configure a geographic identifier associated with the installation location of the television receiver 110A. In at least one embodiment, the user 114A may select the geographic areas of interest for the television receiver 110A. This will typically be the geographic area where the television receiver 110A is located. However, the user 114A may want to receive alerts for other areas, such as areas they travel to frequently or areas where they have friends or family.

In at least one embodiment, the alert information may comprise a weather alert which is geographically relevant to the television receiver 110A. The television receiver 110A may process the alert information and output the weather alert for presentation by the presentation device 114A. For example, the television receiver 110A may overlay the weather alert onto the television programming presently being output. In another embodiment, the television programming may be resized and the weather alert may be presented along an edge of the resized television programming. The alert information may also comprise an emergency alert unrelated to weather. In this scenario, the alert information may similarly be overlaid onto the television programming and/or presented in association therewith as described above.

As described above, the alert information may be transmitted across a wide area which includes many geographic locations. Thus, each television receiver 110A-110C may receive the same alert information in the transport stream and process the information accordingly to determine whether the output the information for presentation to a user 114A-114C. For example, the television receiver 110A may be located in California, whereas the television receivers 110B and 110C may be located in Colorado. Thus, if a weather alert is targeted towards California, then the television receiver 110A may process and output the alert for presentation, whereas the television receivers 110B and 110C will process and discard the alert rather than presenting the same. Further granularity is also possible in accordance with the techniques described herein. For example, a flash flood warning for Fort Collins, Colorado may be processed and output by the television receiver 110B located in Fort Collins, but may be processed and discarded by the television receiver 110C located in Denver.

In some cases, the television distribution network 108 may transmit alert information messages multiple times. For example, the television distribution network 108 may receive a plurality of alert messages and forecast information which are transmitted over a span of several minutes. Once each of the messages has been transmitted, the television distribution network 108 may repeat transmission of the previously broadcasted information. The repetitive transmission of alert information may continue until such information has expired (e.g., the expiration of a particular weather alert). Thus, in at least one embodiment, the television receiver 110A may receive alert information multiple times and may be configured to output the alert information once. The television receiver 110A is thus configured to remember whether a particular alert has already been presented such that the user 114A is not shown the same alert multiple times. In at least one embodiment, each alert information message may include a unique identifier that facilitates the processing of multiple instances of the same message by the television receiver 110A. In another embodiment, alert information may be output by the television receiver 110A-110C multiple times according to a designated schedule, e.g., every 5 minutes, until an expiration time of the message.

In at least one embodiment, the weather information may comprise forecast information, satellite images or radar images which are available for on-demand viewing by a user 114A-114C. Each television receiver 110A-110C may receive and store geographically relevant forecast information for subsequent presentation to a user 114A-114C. For example, a television receiver 110A located in Los Angeles may receive and store forecast information for the Los Angeles area received from the television distribution network 106. As subsequent forecast updates are received, previous forecast data may be overwritten by the television receiver 110A. The forecast information may be accessed by the user 114A through an appropriate interface of the television receiver 110A. For example, the user 114A may select a virtual channel or otherwise navigate a user interface to access the forecast information. Because the forecast information is stored in memory, it is available for immediate viewing by the user 114A. Furthermore, the forecast information may be updated in the television receivers 110A-110C throughout the day, allowing the user to access fresh forecast data at anytime.

Figure 2:
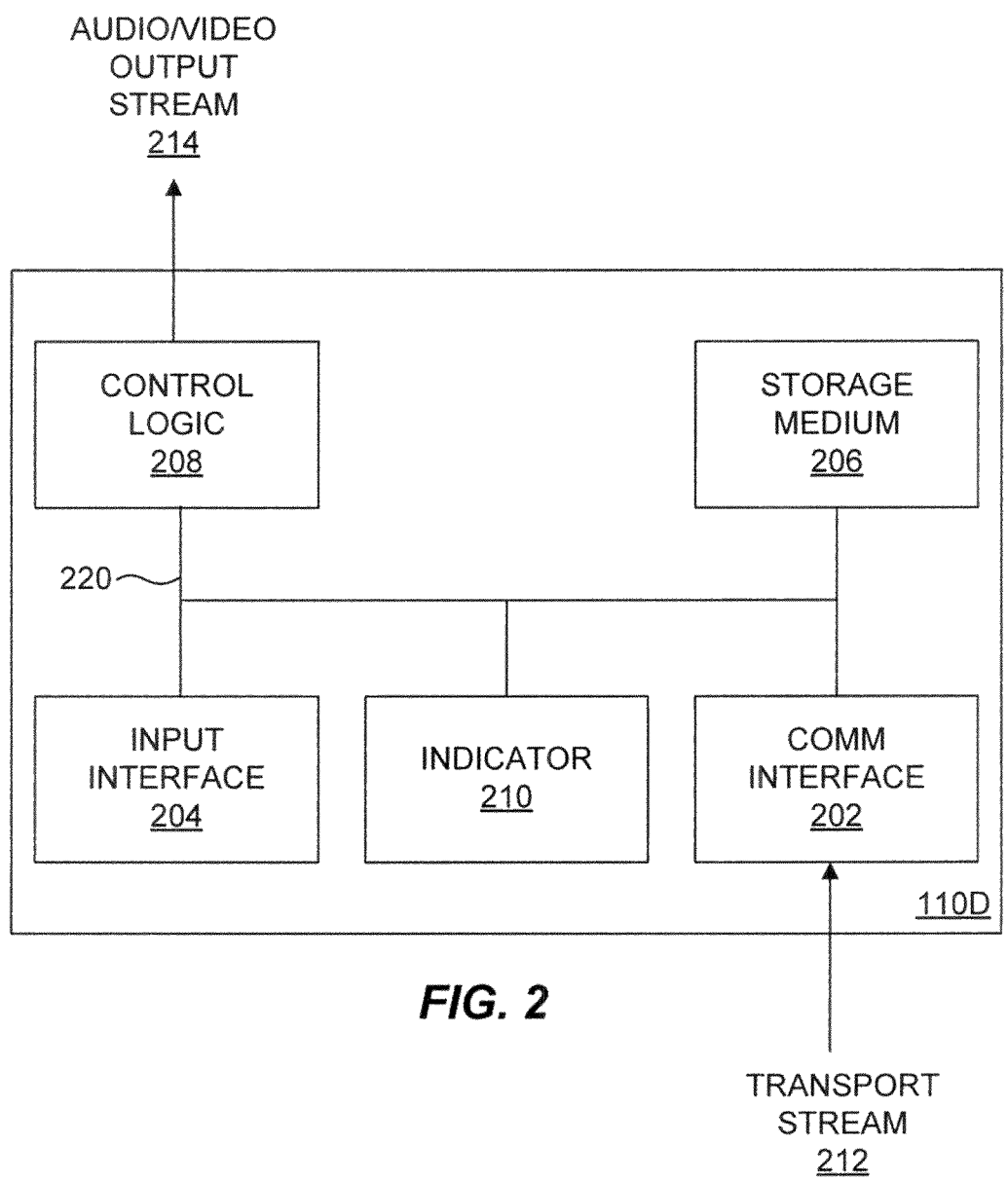
FIG. 2 illustrates an embodiment of a television receiver of FIG. 1.

FIG. 2 illustrates an embodiment of a television receiver of FIG. 1. FIG. 2 will be discussed in reference to the communication system 100 illustrated in FIG. 1. The television receiver 110D includes a communication interface 202, an input interface 204, a storage medium 206 and control logic 208. The television receiver 110D may also include an optional indicator device 210. The various components may be communicatively coupled together by one or more buses 220. Each of these components will be discussed in greater detail below. The television receiver 110D may include other elements, components or devices which are not illustrated for the sake of brevity.

The communication interface 202 is operable to receive a transport stream 212 from the television distribution network 108 including television programming. The communication interface 202 may receive an over-the-air (OTA) broadcast, a direct broadcast satellite signal, a cable television signal or an internet protocol television (IPTV) signal and tune the transport steam 212 to extract the selected television programming. In at least one embodiment, the communication interface 202 may be configured to receive multiple transport streams carried in different signal communication channels. For example, in a satellite distribution network, the communication interface 202 may be capable of tuning multiple transport streams, each carried in a different transponder signal from the satellite. The communication interface 202 may be configured to tune to a particular transponder signal in order to receive particular television programs carried in the corresponding transport stream.

More particularly, each television program may be associated with one or more PIDs in the transport stream. Furthermore, supplemental information, such as alert information, may be transported in the transport stream in a separate PID. Thus, the communication interface 202 may receive television programming and alert information simultaneously within the same transport stream.

In at least one embodiment, the television receiver 110D may include a plurality of communication interfaces 202, utilized by the television receiver 110D to output and/or record multiple television programs simultaneously. Furthermore, the television receiver 110D may include multiple types of communication interfaces 202, such as a satellite television tuner to receive content from a satellite television distribution network and an over-the-air (OTA) television tuner to receive programming from a terrestrial broadcast system.

The input interface 204 is operable to wirelessly receive data from a remote control or other input device (not shown in FIGS. 1-2). The input interface 204 may communicate with a remote control utilizing any type of IR and/or RF communication link. In at least one embodiment, the input interface 204 receives a key code from a remote control and responsively provides the key code to the control logic 208 for processing. The data received from the remote control may be utilized by the control logic 208 to control the output of content by the control logic 208. Some of the data received by the input interface 204 may request to view electronic programming guide data, menus, set recording timers, change channels, view weather information and the like.

Storage medium 206 may comprise any sort of digital memory (including any sort of read only memory (ROM), RAM, flash memory and/or the like) or any combination of the aforementioned. The storage medium 206 may store a geographic identifier, forecast information, weather alerts, emergency alerts and the like for utilization by the control logic 208. Alternatively or additionally, such information may be stored in a non-volatile memory of the television receiver 110D. The television receiver 110D may optionally include non-volatile memory appropriate for storing video signals recorded by the television receiver 110D for subsequent viewing by a user. Exemplary storage mediums 206 include hard drives (e.g., magnetic memory), flash memory, battery backed up memory and the like. In at least one embodiment, the storage medium 206 may be internally located within the television receiver 110D. In other embodiments, the storage medium 206 may be located external with respect to the television receiver 110D. The television receiver 110D may also utilize a combination of internal and external storage mediums 206 for storage of video signals.

The control logic 208 is operable to control the operation of the television receiver 110D and output of content therefrom. The control logic 208 may be a single processing device or a plurality of processing devices that cooperatively operate to control the operation of the television receiver 110D. The control logic 208 may include various components or modules for processing and outputting audio/video content. Exemplary components or modules for processing audio/video content include a demodulator, a decoder, a decompressor, a conditional access module and a transcoder module.

In a live mode, the control logic 208 controls the reception of specified content (e.g., the transport stream 212) by the communication interface 202 and coordinates the output of the audio/video output stream 212 to the presentation device 112A for presentation to a user 114A. For example, the user 114A may request to view a specified channel by providing input to the television receiver 110D via a remote control (not shown). The remote control transmits the command to the television receiver 110D requesting output of the content associated with a specified channel. The control logic 208 operates to control the communication interface 202 to switch to the requested channel and receive the transport stream 212 associated with the channel. The communication interface 202 receives and extracts the corresponding audio/video content from the transport stream for output to the presentation device 112A.

The presentation device 112A then presents the audio/video output stream 214 to the user 114A. The control logic 208 may incorporate circuitry to output audio/video streams in any format recognizable by a presentation device 112A, including composite video, component video, Digital Visual Interface (DVI), High-Definition Multimedia Interface (HDMI), 1394 and WiFi The control logic 208 may also incorporate circuitry to support multiple types of these or other audio/video formats. In at least one embodiment, as described above, the television receiver 110D may be integrated with the presentation device 112A, and the control logic 208 may be operable to control the presentation of the audio/video output stream 214 by the presentation device 112A.

As described above, the communication interface 202 is further operable to receive alert information in the transport stream 212. For example, the communication interface 202 may be operable to receive a PID associated with alert information simultaneously while receiving television programming in the transport steam 212. The communication interface 202 transmits the weather information to the control logic 208 for further processing.

In at least one embodiment, the control logic 208 processes the alert information to determine whether the message is relevant to the user 114A. For example, the control logic 208 may compare a geographic identifier (e.g., a SAME code or zip code) with similar data in the alert information to determine whether the message is relevant to the user 114A. If the control logic 208 determines that the message is relevant to the user 114A, then the control logic 208 further determines whether to output the alert information. For example, if the alert information comprises an emergency alert or weather alert, then the control logic 208 may output the alert information, such as in a banner, overlay or the like for presentation in association with television programming. If the alert information comprises geographically relevant forecast information, then the control logic 208 may coordinate storage of the forecast information in the storage medium 206 for subsequent presentation to the user 114A. If similar or identical alert information is received multiple times, then the control logic 208 may be operable to identify whether such information has previously been output. If so, in at least one embodiment, the control logic 208 is operable to discard or otherwise not display subsequent instances of the message.

The indicator 210 may include any type of appropriate output device, such as a display, buzzer, speaker, LED and/or flashing light or the like. For example, a yellow flashing light may indicate an active watch notice whereas as flashing red light may indicate an active warning. In at least one embodiment, the indicator 210 is activated by the control logic 208 during the output an alert message. For example, a buzzer may be activated as the presentation device 112A displays a warning message.

Sometimes, weather alerts may be issued while the user 114A is not watching television. However, many television receivers 110D may be left in a standby mode even when nut in use by the user 114A and may still be capable of receiving alert information when not in use to receive television programming. Thus, in at least one embodiment, the indicator 210 may be utilized when the television receiver 110D is operating in a standby mode (e.g., not outputting content to the presentation device 112A) in order to provide alert information to the user 114A. For example, a speaker may issue an audible warning corresponding with a weather or emergency alert. Likewise, a flashing light on the television receiver 110D may be activated and/or a message may be displayed on a front panel display of the television receiver 110D. In at least one embodiment, the particular indicator functionality may be configured based on user preferences.

Furthermore, in at least one embodiment, the television receiver 110D may be configured to activate the presentation device 112A in order to present alert information. For example, the television receiver 110D may include an IR emitter that emits an IR signal in order to turn on the television to output weather alert information received and outputted by the control logic 208. In at least one embodiment, the control logic 208 may operate to activate the presentation device 112A via CEC codes according to the HDMI protocol. Thus, the television receiver 110D may utilize the presentation device 112A to output weather alert information even when the user 114A is not watching television.

Figure 3:
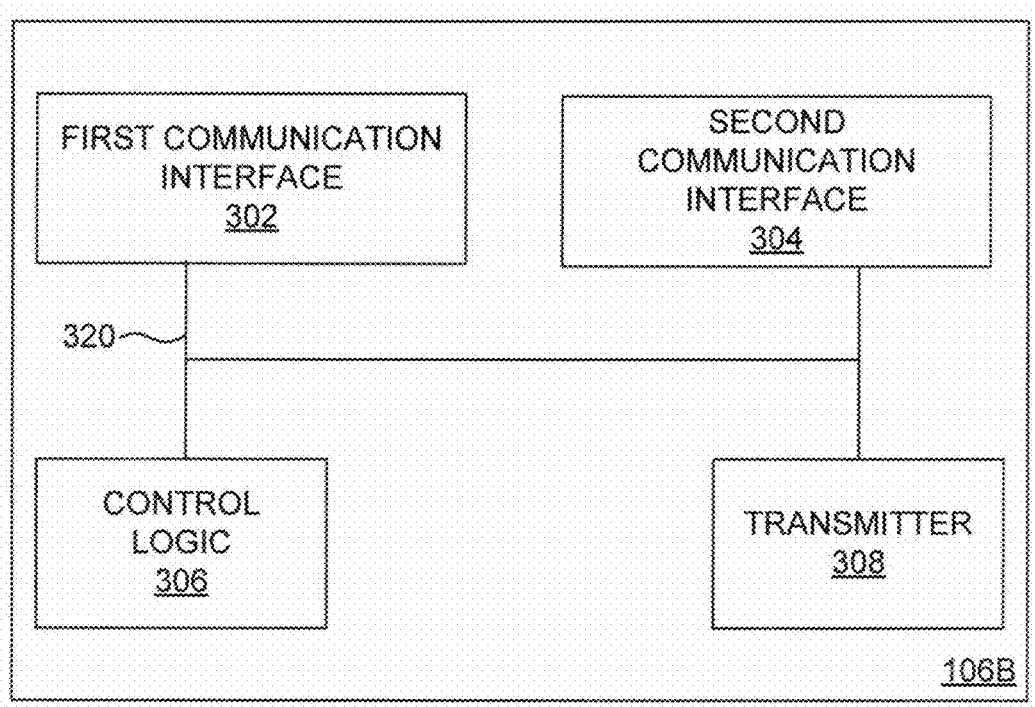
FIG. 3 illustrates an embodiment of the television broadcasting system of FIG. 1.

FIG. 3 illustrates an embodiment of the television broadcasting system of FIG. 1. The television broadcasting system 106B includes a first communication interface 302, a second communication interface 304, control logic 306 and a transmitter 308. The components of the television broadcasting system 106B may be communicatively coupled using one or more buses 320. Each of these components is discussed in greater detail below. The television broadcasting system 106B will be described in the context of the communication system 100 of FIGS. 1-2. The television broadcasting system 106B may include other components, elements or devices not illustrated for the sake of brevity.

The first communication interface 302 is operable to receive one or more television programs from the content source 102. The first communication interface 302 may receive content from any number of content sources 102 through any number of communication links. For example, the first communication interface 302 may receive content via satellite communication links, fiber optics communication links, microwave links or the like. In at least one embodiment, the first communication interface 302 comprises a satellite receiver operable to receive content from an orbiting satellite. The first communication interface 302 may further include associated decryption software operable to decrypt the content for further processing by the television broadcasting system 106A. In another embodiment, the first communication interface 302 may include communication terminal communicatively coupled to a local area or wide area network that receives content over an internet protocol (IP) network or the like. The first communication interface 302 may include any number of discrete components or systems operable to receive content from one or more of the content sources 102.

The second communication interface 304 is operable to receive alert information from an alert provider 104. In at least one embodiment, the second communication interface 304 includes a satellite weather receiver that receives alert information from an orbiting satellite and provides the weather information to the control logic 306 for further processing. The second communication interface 304 may receive alert information from any number of alert providers 104.

The control logic 306 is operable to control the operation of the television broadcasting system 106A and generate a transport stream for transmission to the television receivers 110A-110C. The control logic 306 may be a single processing device or a plurality of processing devices that cooperatively operate to control the operation of the television broadcasting system 106A. For example, the control logic 306 may include a weather processing module that formats the received alert information for further processing and a transport stream generation module that aggregates content from multiple sources for transmission to the television receivers 110A-110C.

In at least one embodiment, the control logic 306 may reformat or translate the alert information into a format compatible with the television receivers 110A-110C. For example, the control logic 306 may remove header information of the alert information received from the alert provider 104 and insert proprietary header information compatible with the television receivers 110A-110C.

In at least one embodiment, the header information includes a start code and a product type identifier. The message further includes a geographic identifier, e.g., EAS/SAME code), which may have any number of identifiers as desired (e.g., the message is targeted at multiple locations). The header information may also include an expiration time of the message, which may be specified according to any desired format.

In at least one embodiment, the control logic 306 aggregates alert information from multiple sources and selects at least a portion of the data for further transmission to the television receivers 110A-110C. The control logic 306 may also select portions of the alert information for further transmission to the television receivers 110A-110C. For example, previously received messages may have also carried the same information and the control logic 306 may determine that further transmission of the alert information is not desired. In another embodiment, the control logic 306 may identify that portions of the alert information are not intended for any geographic area served by the television broadcasting system 106A and may responsively ignore and/or discard the received alert information.

As described above, alert information received from the NWS may include SAME codes designating a geographic area associated with a message. In at least one embodiment, the SAME codes may be included with the alert information as transmitted to the television receivers 110A-110C. In other embodiments, the SAME codes may be translated into a geographic identifier (e.g., zip code) compatible with the television receivers 110A-110C.

The control logic 306 is further operable to multiplex one or more television programs and the alert information into a transport stream (e.g., the transport stream 212). More particularly, the control logic 306 generates transport packets from the television programs and alert information. In at least one embodiment, the transport stream is formatted in accordance with the MPEG protocols. For example, each television program may be assigned one or more PIDs in a packetized elementary stream (PES). The control logic 306 may generate multiple transport streams, each associated with a signal communication channel. As described above, each transport stream may include different television programs but may include the same alert information.

Furthermore, the control logic 306 may cycle through the alert information for transmission in the transport streams multiple times. For example, the alert information may be transmitted every 10 minutes throughout the day. The data may be continuously sent until expiration based on a purge time specified in the alert information. In at least one embodiment, the control logic 306 may cycle through transmission of the alert information on multiple signal communication channels in any desired order, e.g., the alert information is transmitted on a first communication channel al time 1, on a second communication channel at time 2 and a third communication channel at time 3. Portions of the alert information may be updated throughout the day as updates are received from the alert provider 104. The alert information may include weather alerts and forecast information covering a wide geographic area. Thus, a television receiver 110A may receive correspondingly relevant information every 10 minutes. In at least one embodiment, particular portions of the weather alert information may be prioritized for transmission. For example, the control logic 306 may prioritize the transmission of recently received weather alerts ahead of the transmission of forecast information.

The transmitter 308 is operable to initiate broadcasting of the transport stream to a plurality of television receivers 110A-110C. In at least one embodiment, the transmitter 308 is embodied as a satellite uplink that modulates the transport streams in a corresponding signal communication channel for transportation to an orbiting satellite. In another embodiment the transmitter 308 may generate a cable signal (e.g., QAM) for transmission of the transport stream in an appropriate QAM channel. Other embodiments of the transmitter 308 include IPTV servers and terrestrial broadcast centers which transmit the transport stream to the television receivers 110A-110C over an appropriate communication link.

Figure 4:
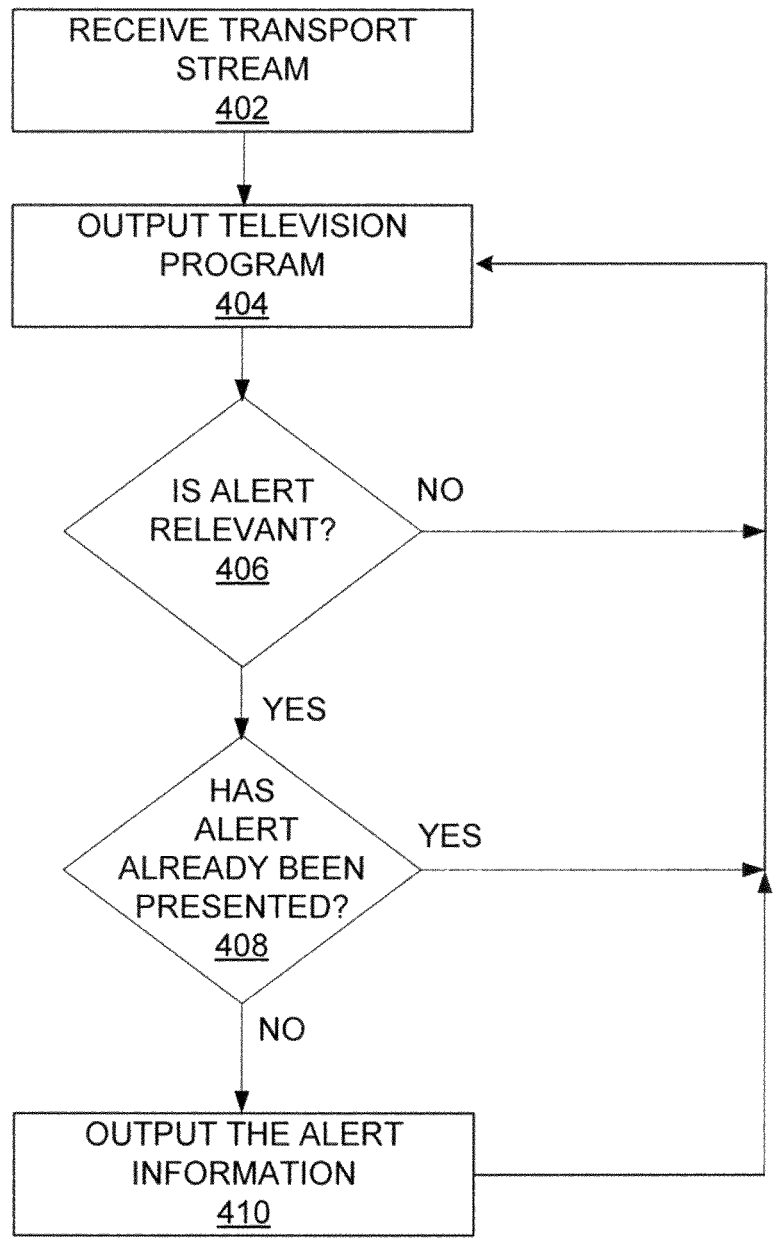
FIG. 4 illustrates an embodiment of a method for presenting weather information on a television receiver.

FIG. 4 illustrates an embodiment of a method of presenting weather information on a television receiver. More particularly, the method of FIG. 4 is directed at receiving television programming and alert information separately in a single transport stream and determining whether to output the alert information for presentation to a user. The method of FIG. 4 may include other operations not illustrated for the sake of brevity.

The method includes receiving a transport stream at a television receiver (operation 402). The transport stream includes a first set of packets associated with a first television program and a second set of packets associated with emergency alert information. The particular transport stream received by the television receiver may be selected based on programming to be output by the television receiver. The process further includes outputting the first television program for presentation by a presentation device (operation 404).

The process further includes processing the second set of packets to determine whether received alert information is relevant to the user (operation 406). More particularly, in at least one embodiment, operation 406 may include comparing geographic identifiers in the alert information with geographic identifier(s) associated with the television receiver to determine whether to output the alert information. In some embodiments, a user may select which alert information they desire to see. For example, the user may desire to see certain types of weather alerts and not others. Thus, a television receiver may include an input menu or the like that allows the user to designate particular alert types for output. In operation 406, the television receiver may compare an alert type identifier in a received message against user selected identifier types to determine whether to output the alert information. If the alert information is not relevant to the user, then processing continues in operation 404.

If the alert information is relevant to the user, then processing continues in operation 408 to determine whether the alert message has previously been output to the user. If the message has not been previously output to the user, then processing continues in operation 410 and the emergency alert information is outputted in association with the television program for presentation by the presentation device. Otherwise, processing continues in operation 404 and the message is not outputted again. In some cases, a message may be configured for output multiple times. Thus, even if the message has been presented before, the processing in operation 408 may proceed to operation 410, where the message is output for presentation to the user. In practice, the operation of the process of FIG. 4 will return to operation 404 and continue as new alerts are delivered to the receiving device.

Although specific embodiments were described herein, the scope of the invention is not limited to those specific embodiments. The scope of the invention is defined by the following claims and any equivalents therein.

I claim:

1. A television receiver comprising:
  a communication interface operable to receive a transport stream, the transport stream including a first set of packets associated with a first television program and a second set of packets associated with weather information;
  control logic communicatively coupled to the communication interface, the control logic operable to process the second set of packets to determine whether to output the weather information; and
  an output interface operable to output at least one of the first television program and the weather information for presentation by a presentation device, wherein:
    the first set of packets associated with the first television program are associated with one or more program identifiers (PIDs) and the second set of packets associated with weather information are associated with a different program identifier (PID) that is different from the one or more program identifiers (PIDs) associated with the first set of packets associated with the first television program;
    the transport stream further includes a third set of packets associated with second television program, wherein the third set of packets associated with the second television program are associated with one or more program identifiers (PIDs) different from the one or more program identifiers (PIDs) associated with the first set of packets associated with the first program; and
    the one or more program identifiers (PIDs) associated with the first set of packets include a first program identifier associated with a video component of the first program and a different second program identifier (PID) associated with an audio component of the first program, the one or more program identifiers (PIDs) associated with the third set of packets include a third program identifier associated with a video component of the second program and a different fourth program identifier associated with an audio component of the second program, and the program identifier (PID) associated with the second set of packets associated with weather information is a fifth program identifier (PID) different from the first, second, third and fourth program identifier (PIDs).

2. The television receiver of claim 1, wherein the communication interface is operable to receive the transport stream from a satellite communication network and the transport stream is carried in a single signal communication channel of the satellite communication network.

3. The television receiver of claim 1, wherein the weather information comprises a weather alert and the control logic is operable to determine whether to output the weather alert based on a geographic identifier associated with the television receiver.

4. The television receiver of claim 3, wherein the geographic identifier comprises an emergency alert system (EAS) specific area message encoding (SAME) code.

5. The television receiver of claim 3, wherein the control logic overlays the weather alert onto video content of the first television program.

6. The television receiver of claim 3, wherein the weather alert is received while the television receiver is operating in a standby mode and the control logic is operable to activate an indicator device associated with the television receiver to present the weather alert.

7. The television receiver of claim 3, wherein the weather alert is received while the television receiver is operating in a standby mode and the control logic is operable to initiate powering on of the presentation device and output the weather alert for presentation by the presentation device.

8. The television receiver of claim 3, wherein the weather alert is received while the television receiver is operating in a standby mode and the control logic is operable to initiate storage of the weather information upon reception by the television receiver and output the weather alert responsive to the television receiver exiting the standby mode.

9. The television receiver of claim 1, wherein the weather information comprises forecast information and the control logic is operable to initiate storage of the weather information upon reception by the television receiver and output the weather alert responsive to user input requesting to view the forecast information.

10. A method of presenting weather information on a television receiver, the method comprising:
   receiving a transport stream at a television receiver, the transport stream including a first set of packets associated with a first television program and a second set of packets associated with emergency alert information;
   outputting the first television program for presentation by a presentation device;
   processing the second set of packets to determine whether to output the emergency alert information; and
   responsive to determining that the emergency alert information is to be outputted, outputting the emergency alert information, in association with the television program, for presentation by the presentation device, wherein:
      the first set of packets associated with the first television program are associated with one or more program identifiers (PIDs) and the second set of packets associated with weather information are associated with a different program identifier (PID) that is different from the one or more program identifiers (PIDs) associated with the first set of packets associated with the first television program;
      the transport stream further includes a third set of packets associated with second television program, wherein the third set of packets associated with the second television program are associated with one or more program identifiers (PIDs) different from the one or more program identifiers (PIDs) associated with the first set of packets associated with the first program; and
      the one or more program identifiers (PIDs) associated with the first set of packets include a first program identifier associated with a video component of the first program and a different second program identifier (PID) associated with an audio component of the first program, the one or more program identifiers (PIDs) associated with the third set of packets include a third program identifier associated with a video component of the second program and a different fourth program identifier associated with an audio component of the second program, and the program identifier (PID) associated with the second set of packets associated with weather information is a fifth program identifier (PID) different from the first, second, third and fourth program identifier (PIDs).

11. The method of claim 10, wherein the emergency alert information comprises a weather alert.

12. The method of claim 11, wherein outputting the emergency alert information further comprises:
   overlaying the weather alert onto a portion of the first television program.

13. The method of claim 10, wherein processing the second set of packets to determine whether to output the emergency alert information further comprises:
   determining whether a first geographic identifier, associated with the emergency alert information, corresponds with a second geographic identifier, associated with the television receiver.

14. The method of claim 13, wherein processing the second set of packets to determine whether to output the emergency alert information further comprises:
   determining whether the first geographic identifier corresponds with a third geographic identifier, selected by a user of the television receiver.

15. The method of claim 13, wherein processing the second set of packets to determine whether to output the emergency alert information further comprises:
   determining whether a message alert identifier, associated with the emergency alert information, corresponds with at least one user selected alert identifier associated with the television receiver.

16. The method of claim 10, wherein processing the second set of packets to determine whether to output the emergency alert information further comprises:
   determining whether the emergency alert information was previously received by the television receiver; and
   responsive to determining that the emergency alert information was previously received, determining whether to output a subsequent instance of the emergency alert information.

17. A television broadcasting system comprising:
   a first communication interface operable to receive at least one television program from at least one content source;
   a second communication interface operable to receive weather information from a weather service provider;
   control logic operable to multiplex the at least one television program and the weather information into a transport stream; and
   a transmitter operable to initiate broadcasting of the transport stream to a plurality of television receivers, wherein the control logic is further operable to translate the weather information received from the weather service provider into a format compatible with the television receivers by being operable to remove header information of the weather information received from the weather service provider and insert different header information compatible with the television receivers.

18. The television broadcasting system of claim 17, wherein:
   the first communication interface is operable to receive a plurality of television programs from the at least one content source;
   the control logic is operable to multiplex a first portion of the plurality of television programs with the weather information into a first transport stream;
   the control logic is operable to multiplex a second portion of the plurality of television programs with the weather information into a second transport stream;
   the transmitter is operable to initiate broadcast of the first transport stream in a first signal communication channel and the second transport stream in a second signal communication channel.

19. The television broadcasting system of claim 17, wherein the control logic is operable to format the weather information received from the weather service provider for further processing by the television receivers.

20. The television broadcasting system of claim 19, wherein the control logic is operable to multiplex a same portion of the weather information into the first transport stream at different times.

21. The television broadcasting system of claim 17, wherein the weather information includes a weather alert and forecast information and the control logic is operable to prioritize transmission of the weather alert higher than the forecast information.

22. The television receiver of claim 1, wherein a first program identifier (PID) identifying the first set of packets and a second program identifier (PID) identifying the second set of packets is for identification within a Motion Picture Experts Group (MPEG) transport stream.

* * * * *